(12) United States Patent
Akagi

(10) Patent No.: US 8,347,234 B2
(45) Date of Patent: Jan. 1, 2013

(54) IMAGE-DISPLAYING DEVICE

(75) Inventor: Koji Akagi, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 632 days.

(21) Appl. No.: 12/153,844

(22) Filed: May 27, 2008

(65) Prior Publication Data

US 2008/0301583 A1 Dec. 4, 2008

(30) Foreign Application Priority Data

May 31, 2007 (JP) ............................... P2007-145885

(51) Int. Cl.
*G06F 3/048* (2006.01)

(52) U.S. Cl. ........ 715/838; 715/835; 715/817; 715/807; 715/812

(58) Field of Classification Search .................. 715/838, 715/835, 807, 805, 817, 812
See application file for complete search history.

(56) References Cited

U.S. PATENT DOCUMENTS

| 5,917,488 | A | * | 6/1999 | Anderson et al. ............. 715/838 |
| 6,538,698 | B1 | * | 3/2003 | Anderson ................. 348/333.05 |
| 6,701,011 | B1 | * | 3/2004 | Nakajima ..................... 382/167 |
| 6,704,775 | B1 | * | 3/2004 | Sato et al. ..................... 709/219 |
| 6,964,025 | B2 | * | 11/2005 | Angiulo et al. ............... 715/838 |
| 2003/0063131 | A1 | * | 4/2003 | Ma ................................. 345/838 |
| 2003/0107777 | A1 | * | 6/2003 | Yamade et al. ............... 358/442 |
| 2004/0070631 | A1 | * | 4/2004 | Brown et al. .................. 345/838 |
| 2005/0188326 | A1 | * | 8/2005 | Ikeda ............................ 715/788 |
| 2005/0237391 | A1 | * | 10/2005 | Shibuya et al. ............ 348/207.1 |
| 2007/0022382 | A1 | * | 1/2007 | Honkaniemi ................. 715/733 |

FOREIGN PATENT DOCUMENTS

JP 2005-109907 4/2005

* cited by examiner

*Primary Examiner* — Tadeese Hailu

(74) *Attorney, Agent, or Firm* — Baker Botts L.L.P.

(57) ABSTRACT

An image-displaying device includes a storing unit and a displaying unit. The storing unit stores first correlation data and second correlation data. The first correlation data indicates a plurality of first thumbnails including a plurality of first display thumbnails and also indicates a sequence of the plurality of first thumbnails. The second correlation data indicates a plurality of second thumbnails including a plurality of second display thumbnails and also indicates a sequence of the plurality of second thumbnails. The storing unit updates the second correlation data in response to an update instruction for adding one of the plurality of first thumbnails to the plurality of second thumbnails. The displaying unit includes a first display configured to display a plurality of first display thumbnails based on the first correlation data, and a second display configured to display a plurality of second display thumbnails based on the second correlation data. The second display displays a plurality of second display thumbnails based on the updated second correlation data if the second correlation data is updated.

14 Claims, 16 Drawing Sheets

FIG.4(a)

| PRESORTED THUMBNAIL ROW LIST | | |
|---|---|---|
| PRESORTED PAGE NUMBER | FILENAME | IN-SCREEN FLAG |
| 1 | aaa.pdf | 1 |
| 2 | b2b2.pdf | 2 |
| 3 | 333c.pdf | 3 |
| 4 | 4ddd.pdf | 4 |
| 5 | V.pdf | 5 |
| 6 | 六.pdf | 6 |
| 7 | しち.pdf | 7 |
| 8 | 八.pdf | 8 |
| ... | ... | ... |
| 11 | eleven.pdf | 11 |
| 12 | 12.pdf | 12 |
| ... | ... | ... |

FIG.4(b)

| FIRST SORTED THUMBNAIL ROW LIST | | | |
|---|---|---|---|
| SORTED PAGE NUMBER | FILENAME | PRESORTED PAGE NUMBER | IN-SCREEN FLAG |
| 1 | aaa.pdf | 1 (I) | 1 |
| 2 | b2b2.pdf | 2 (II) | 1 |
| 3 | 333c.pdf | 3 (III) | 1 |
| 4 | 4ddd.pdf | 4 (IV) | 1 |
| 5 | V.pdf | 5 (V) | 1 |
| 6 | 六.pdf | 6 (VI) | 1 |
| 7 | しち.pdf | 7 (VII) | 1 |
| 8 | 八.pdf | 8 (VIII) | 0 |
| ... | ... | ... | ... |
| 11 | eleven.pdf | 11 (XI) | 1 |
| 12 | 12.pdf | 12 (XII) | 0 |
| ... | ... | ... | ... |

FIG.5(b1)

| FIRST SORTED THUMBNAIL ROW LIST | | | |
|---|---|---|---|
| SORTED PAGE NUMBER | FILENAME | PRESORTED PAGE NUMBER | IN-SCREEN FLAG |
| 1 | aaa.pdf | 1(I) | 1 |
| 2 | b2b2.pdf | 2(II) | 1 |
| 3 | 333c.pdf | 3(III) | 1 |
| 4 | 4ddd.pdf | 4(IV) | 1 |
| 5 | V.pdf | 5(V) | 1 |
| 6 | 六.pdf | 6(VI) | 1 |
| 7 | しち.pdf | 7(VII) | 1 |
| 8 | 八.pdf | 8(VIII) | 0 |
| ... | ... | ... | ... |
| 11 | eleven.pdf | 11(XI) | 0 |
| 12 | 12.pdf | 12(XII) | 0 |
| ... | ... | ... | ... |

FIG.5(b2)

| FIRST SORTED THUMBNAIL ROW LIST | | | |
|---|---|---|---|
| SORTED PAGE NUMBER | FILENAME | PRESORTED PAGE NUMBER | IN-SCREEN FLAG |
| 1 | aaa.pdf | 1(I) | 0 |
| 2 | b2b2.pdf | 2(II) | 0 |
| 3 | 333c.pdf | 3(III) | 0 |
| 4 | 4ddd.pdf | 4(IV) | 0 |
| 5 | V.pdf | 5(V) | 1 |
| 6 | 六.pdf | 6(VI) | 1 |
| 7 | しち.pdf | 7(VII) | 1 |
| 8 | 八.pdf | 8(VIII) | 1 |
| ... | ... | ... | ... |
| 11 | eleven.pdf | 11(XI) | 1 |
| 12 | 12.pdf | 12(XII) | 0 |
| ... | ... | ... | ... |

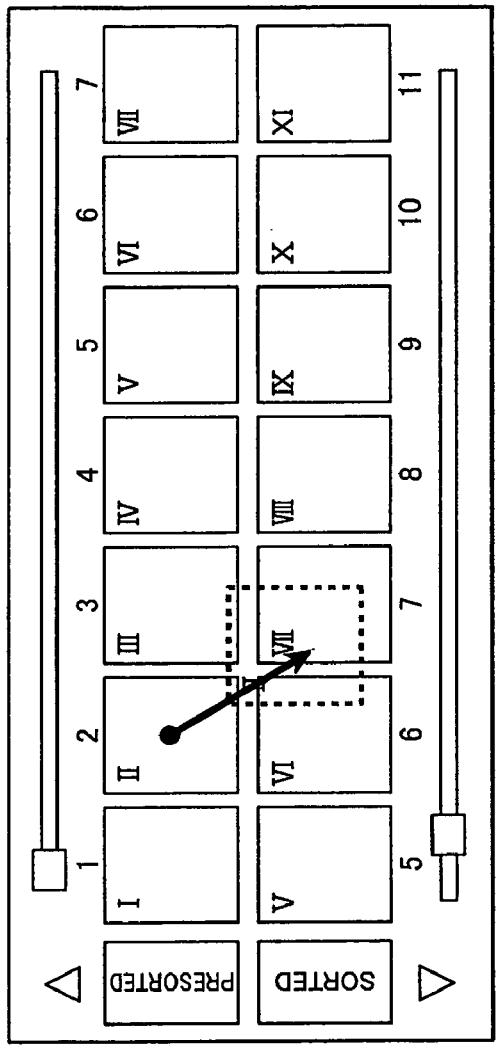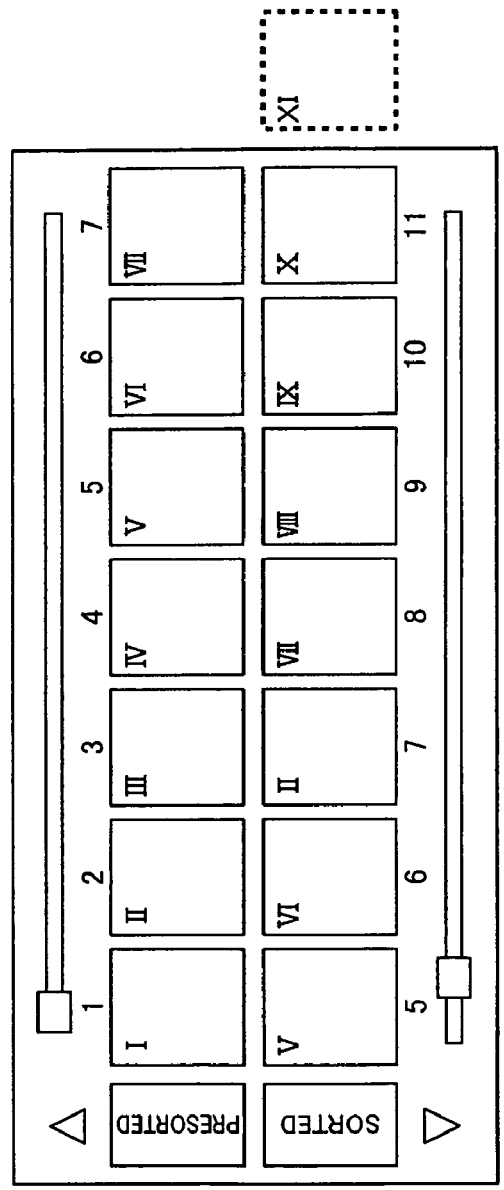
FIG.6(a1)  FIG.6(a2)

FIG.6(b1)

| FIRST SORTED THUMBNAIL ROW LIST | | | |
|---|---|---|---|
| SORTED PAGE NUMBER | FILENAME | PRESORTED PAGE NUMBER | IN-SCREEN FLAG |
| 1 | aaa.pdf | 1(I) | 0 |
| 2 | b2b2.pdf | 2(II) | 0 |
| 3 | 333c.pdf | 3(III) | 0 |
| 4 | 4ddd.pdf | 4(IV) | 0 |
| 5 | V.pdf | 5(V) | 1 |
| 6 | 六.pdf | 6(VI) | 1 |
| 7 | しち.pdf | 7(VII) | 1 |
| 8 | 八.pdf | 8(VIII) | 1 |
| ... | ... | ... | ... |
| 11 | eleven.pdf | 11(XI) | 1 |
| 12 | 12.pdf | 12(XII) | 0 |
| ... | ... | ... | ... |

FIG.6(b2)

| FIRST SORTED THUMBNAIL ROW LIST | | | |
|---|---|---|---|
| SORTED PAGE NUMBER | FILENAME | PRESORTED PAGE NUMBER | IN-SCREEN FLAG |
| 1 | aaa.pdf | 1(I) | 0 |
| 2 | b2b2.pdf | 2(II) | 0 |
| 3 | 333c.pdf | 3(III) | 0 |
| 4 | 4ddd.pdf | 4(IV) | 0 |
| 5 | V.pdf | 5(V) | 1 |
| 6 | 六.pdf | 6(VI) | 1 |
| 7 | b2b2.pdf | 2(II) | 1 |
| 8 | しち.pdf | 7(VII) | 1 |
| 9 | 八.pdf | 8(VIII) | 1 |
| ... | ... | ... | ... |
| 11 | eleven.pdf | 11(XI) | 0 |
| 12 | 12.pdf | 12(XII) | 0 |

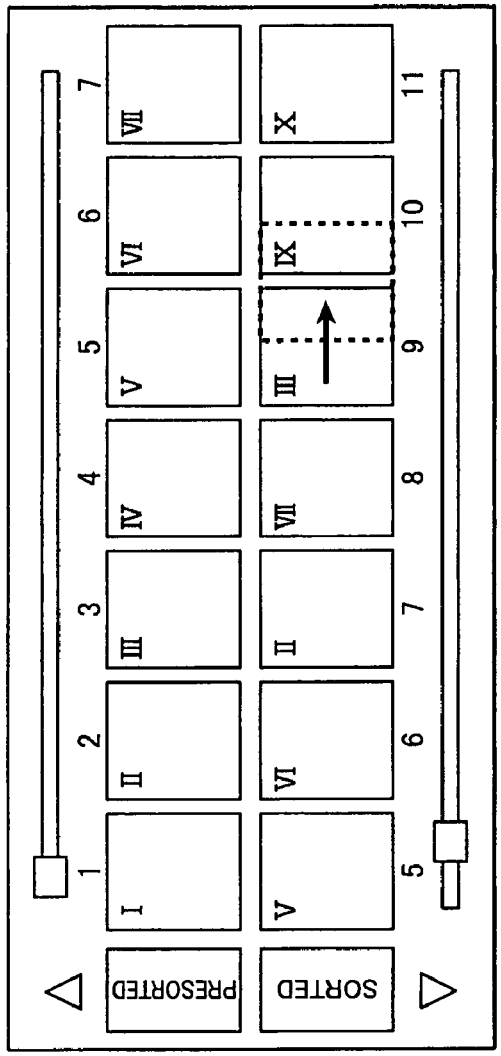
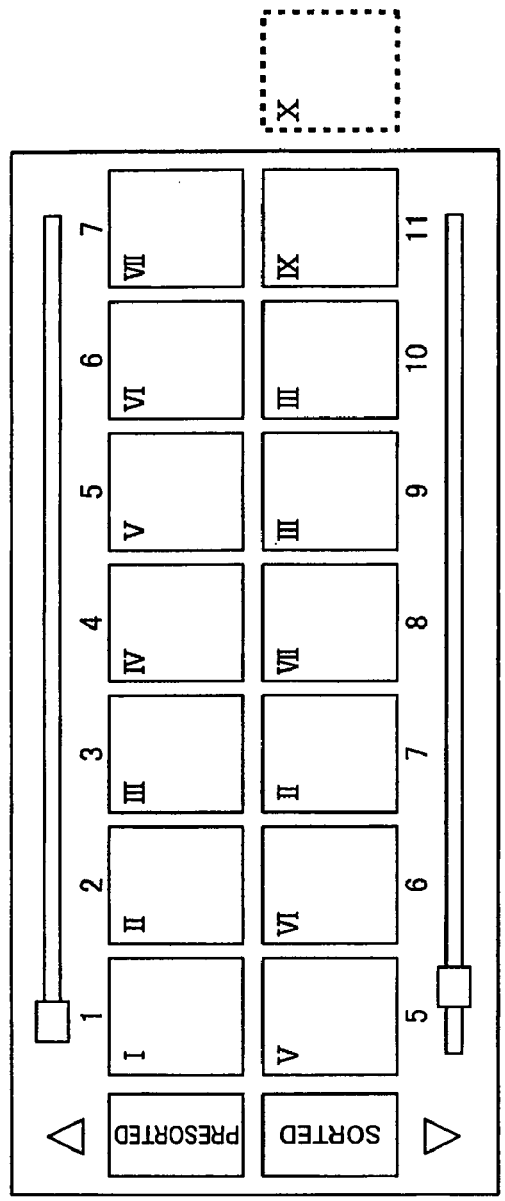
FIG.7(a1)  FIG.7(a2)

FIG.7(b1)

| SORTED PAGE NUMBER (58) | FILENAME (59) | PRESORTED PAGE NUMBER (60) | IN-SCREEN FLAG (61) |
|---|---|---|---|
| FIRST SORTED THUMBNAIL ROW LIST | | | |
| 1 | aaa.pdf | 1(I) | 0 |
| 2 | b2b2.pdf | 2(II) | 0 |
| 3 | 333c.pdf | 3(III) | 0 |
| 4 | 4ddd.pdf | 4(IV) | 0 |
| 5 | V.pdf | 5(V) | 1 |
| 6 | 六.pdf | 6(VI) | 1 |
| 7 | b2b2.pdf | 2(II) | 1 |
| 8 | しち.pdf | 7(VII) | 1 |
| 9 | 333c.pdf | 3(III) | 1 |
| 10 | きゅう.pdf | 9(IX) | 1 |
| 11 | 十.pdf | 10(X) | 1 |
| ... | ... | ... | ... |
| ... | ... | ... | ... |

FIG.7(b2)

| SORTED PAGE NUMBER (58) | FILENAME (59) | PRESORTED PAGE NUMBER (60) | IN-SCREEN FLAG (61) |
|---|---|---|---|
| FIRST SORTED THUMBNAIL ROW LIST | | | |
| 1 | aaa.pdf | 1(I) | 0 |
| 2 | b2b2.pdf | 2(II) | 0 |
| 3 | 333c.pdf | 3(III) | 0 |
| 4 | 4ddd.pdf | 4(IV) | 0 |
| 5 | V.pdf | 5(V) | 1 |
| 6 | 六.pdf | 6(VI) | 1 |
| 7 | b2b2.pdf | 2(II) | 1 |
| 8 | しち.pdf | 7(VII) | 1 |
| 9 | 333c.pdf | 3(III) | 1 |
| 10 | 333c.pdf | 3(III) | 1 |
| 11 | きゅう.pdf | 9(IX) | 1 |
| 12 | 十.pdf | 10(X) | 0 |
| 13 | eleven.pdf | 11(XI) | 0 |
| ... | ... | ... | ... |

FIG.8(b1)

| FIRST SORTED THUMBNAIL ROW LIST | | | |
|---|---|---|---|
| SORTED PAGE NUMBER | FILENAME | PRESORTED PAGE NUMBER | IN-SCREEN FLAG |
| 1 | aaa.pdf | 1(I) | 0 |
| 2 | b2b2.pdf | 2(II) | 0 |
| 3 | 333c.pdf | 3(III) | 0 |
| 4 | 4ddd.pdf | 4(IV) | 0 |
| 5 | V.pdf | 5(V) | 1 |
| 6 | 六.pdf | 6(VI) | 1 |
| 7 | b2b2.pdf | 2(II) | 1 |
| 8 | しち.pdf | 7(VII) | 1 |
| 9 | 333c.pdf | 3(III) | 1 |
| 10 | 333c.pdf | 3(III) | 1 |
| 11 | 八.pdf | 8(VIII) | 1 |
| 12 | 九.pdf | 9(IX) | 0 |
| 13 | 十.pdf | 10(X) | 0 |
| ... | ... | ... | ... |

FIG.8(b2)

| FIRST SORTED THUMBNAIL ROW LIST | | | |
|---|---|---|---|
| SORTED PAGE NUMBER | FILENAME | PRESORTED PAGE NUMBER | IN-SCREEN FLAG |
| 1 | aaa.pdf | 1(I) | 0 |
| 2 | b2b2.pdf | 2(II) | 0 |
| 3 | 333c.pdf | 3(III) | 0 |
| 4 | 4ddd.pdf | 4(IV) | 0 |
| 5 | V.pdf | 5(V) | 1 |
| 6 | 六.pdf | 6(VI) | 1 |
| 7 | b2b2.pdf | 2(II) | 1 |
| 8 | しち.pdf | 7(VII) | 1 |
| 9 | 333c.pdf | 3(III) | 1 |
| 10 | 八.pdf | 8(VIII) | 1 |
| 11 | 九.pdf | 9(IX) | 1 |
| 12 | 十.pdf | 10(X) | 0 |
| ... | ... | ... | ... |
| ... | ... | ... | ... |

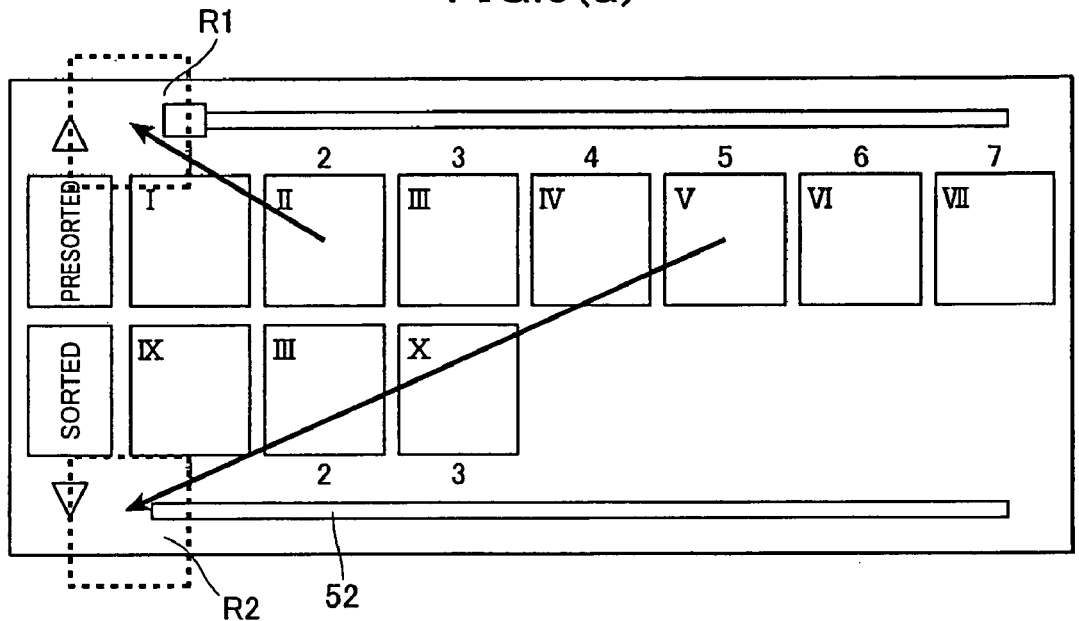

FIG.9(c2)

| SECOND SORTED THUMBNAIL ROW LIST ||||
|---|---|---|---|
| SORTED PAGE NUMBER | FILENAME | PRESORTED PAGE NUMBER | IN-SCREEN FLAG |
| 1 | aaa.pdf | 1(Ⅰ) | 0 |
| 2 | b2b2.pdf | 2(Ⅱ) | 0 |
| 3 | 333c.pdf | 3(Ⅲ) | 0 |
| 4 | 4ddd.pdf | 4(Ⅳ) | 0 |
| 5 | b2b2.pdf | 2(Ⅱ) | 0 |

FIG.9(d1)

| THIRD SORTED THUMBNAIL ROW LIST ||||
|---|---|---|---|
| SORTED PAGE NUMBER | FILENAME | PRESORTED PAGE NUMBER | IN-SCREEN FLAG |
| 1 | V.pdf | 5(Ⅴ) | 0 |
| 2 | 4ddd.pdf | 4(Ⅳ) | 0 |
| 3 | 六.pdf | 6(Ⅵ) | 0 |
| 4 | しち.pdf | 7(Ⅶ) | 0 |

FIG.9(d2)

| THIRD SORTED THUMBNAIL ROW LIST ||||
|---|---|---|---|
| SORTED PAGE NUMBER | FILENAME | PRESORTED PAGE NUMBER | IN-SCREEN FLAG |
| 1 | V.pdf | 5(Ⅴ) | 0 |
| 2 | 4ddd.pdf | 4(Ⅳ) | 0 |
| 3 | 六.pdf | 6(Ⅵ) | 0 |
| 4 | しち.pdf | 7(Ⅶ) | 0 |
| 5 | V.pdf | 5(Ⅴ) | 0 |

IMAGE-DISPLAYING DEVICE

CROSS REFERENCE TO RELATED APPLICATION

This application claims priority from Japanese Patent Application No. 2007-145885 filed May 31, 2007. The entire content of each of these priority applications is incorporated herein by reference.

TECHNICAL FIELD

The present invention relates to an image-displaying device capable of displaying and reordering thumbnail images.

BACKGROUND

An image-displaying device including a display that displays thumbnail images created from data for a plurality of images is well known in the art. One such image-displaying device disclosed in Japanese unexamined patent application publication No. 2005-109907 allows the user to select thumbnail images from among thumbnail images arranged in a prescribed order on a display unit 32, sorts the selected thumbnail images and the non-selected thumbnail images when the user presses a Finished button BT10 to indicate that the user has finished selecting thumbnail images, and displays the selected thumbnail images separately from the non-selected thumbnail images.

SUMMARY

However, with the technology disclosed in Japanese unexamined patent application publication No. 2005-109907 described above, the original order of the thumbnail images is forgotten after rearranging the images. Hence, if the user wishes to return to the original order after the thumbnail images have been rearranged, the user must manually arrange the thumbnail images from memory.

Generally, the thumbnail images are originally in an order based on some logical condition, such as the creation date, date the image was captured, filename, data size, or the like. By arranging the thumbnail images according to some logical condition in this way, the user can easily select desired thumbnail images from among a plurality of images and reorder these thumbnail images based on their displayed order. For example, the user can select desired images from among those captured after a specific date and sort them based on their captured date.

Japanese unexamined patent application publication No. 2005-109907 is problematic in that once the original arrangement of the thumbnail images is lost, data facilitating the user in selecting desired thumbnail images and arranging the thumbnail images in a desired order is also lost.

In view of the foregoing, it is an object of the present invention to provide an image-displaying device that allows the user to select desired images and rearrange thumbnail images in a desired order, while being able to view the original order of the thumbnail images.

In order to attain the above and other objects, the present invention provides an image-displaying device including a storing unit and a displaying unit. The storing unit stores first correlation data and second correlation data. The first correlation data indicates a plurality of first thumbnails including a plurality of first display thumbnails and also indicates a sequence of the plurality of first thumbnails. The second correlation data indicates a plurality of second thumbnails including a plurality of second display thumbnails and also indicates a sequence of the plurality of second thumbnails. The storing unit updates the second correlation data in response to an update instruction for adding one of the plurality of first thumbnails to the plurality of second thumbnails. The displaying unit includes a first display configured to display a plurality of first display thumbnails based on the first correlation data, and a second display configured to display a plurality of second display thumbnails based on the second correlation data. The second display displays a plurality of second display thumbnails based on the updated second correlation data if the second correlation data is updated.

Another aspect of the present invention provides an image-displaying device including a storing unit, a displaying unit, and a receiving unit. The storing unit stores first correlation data associating first images with a first display order in a first thumbnail row, and second correlation data associating second images with a second display order in a second thumbnail row. The displaying unit includes first display regions corresponding to the first display order and second display regions corresponding to the second display order. The displaying unit displays first thumbnail images of the first images as the first thumbnail row in the first display regions based on the first correlation data, and displays second thumbnail images of the second images as the second thumbnail row in the second display regions based on the second correlation data. The receiving unit receives an adding instruction to add one of the first images in the first thumbnail row to the second thumbnail row. The managing unit updates the second correlation data when the receiving unit receives the adding instruction. The displaying unit displays the second thumbnail row according to the second correlation data when the second correlation data is updated, while maintaining the first thumbnail row unchanged.

BRIEF DESCRIPTION OF THE DRAWINGS

The particular features and advantages of the invention as well as other objects will become apparent from the following description taken in connection with the accompanying drawings, in which:

FIG. 6 is an explanatory diagram showing (a1) the thumbnail image display before adding an image, (a2) the thumbnail image display after adding an image, (b1) the first list of sorted thumbnails before adding an image, and (b2) the first list of sorted thumbnails after adding an image;

FIG. 7 is an explanatory diagram showing (a1) the thumbnail image display before adding an image, (a2) the thumbnail image display after adding an image, (b1) the first list of sorted thumbnails before adding an image, and (b2) the first list of sorted thumbnails after adding an image;

FIG. 9 is an explanatory diagram showing (a) the thumbnail image display when displaying thumbnails for image data belonging to the first group in the sorted thumbnail row, (b) the first list of sorted thumbnails, (c1) a second list of sorted thumbnails before adding an image, (c2) the second list of sorted thumbnails after adding an image, (d1) a third list of sorted thumbnails before adding an image, and (d2) the third list of sorted thumbnails after adding an image.

DETAILED DESCRIPTION

Figure 1:
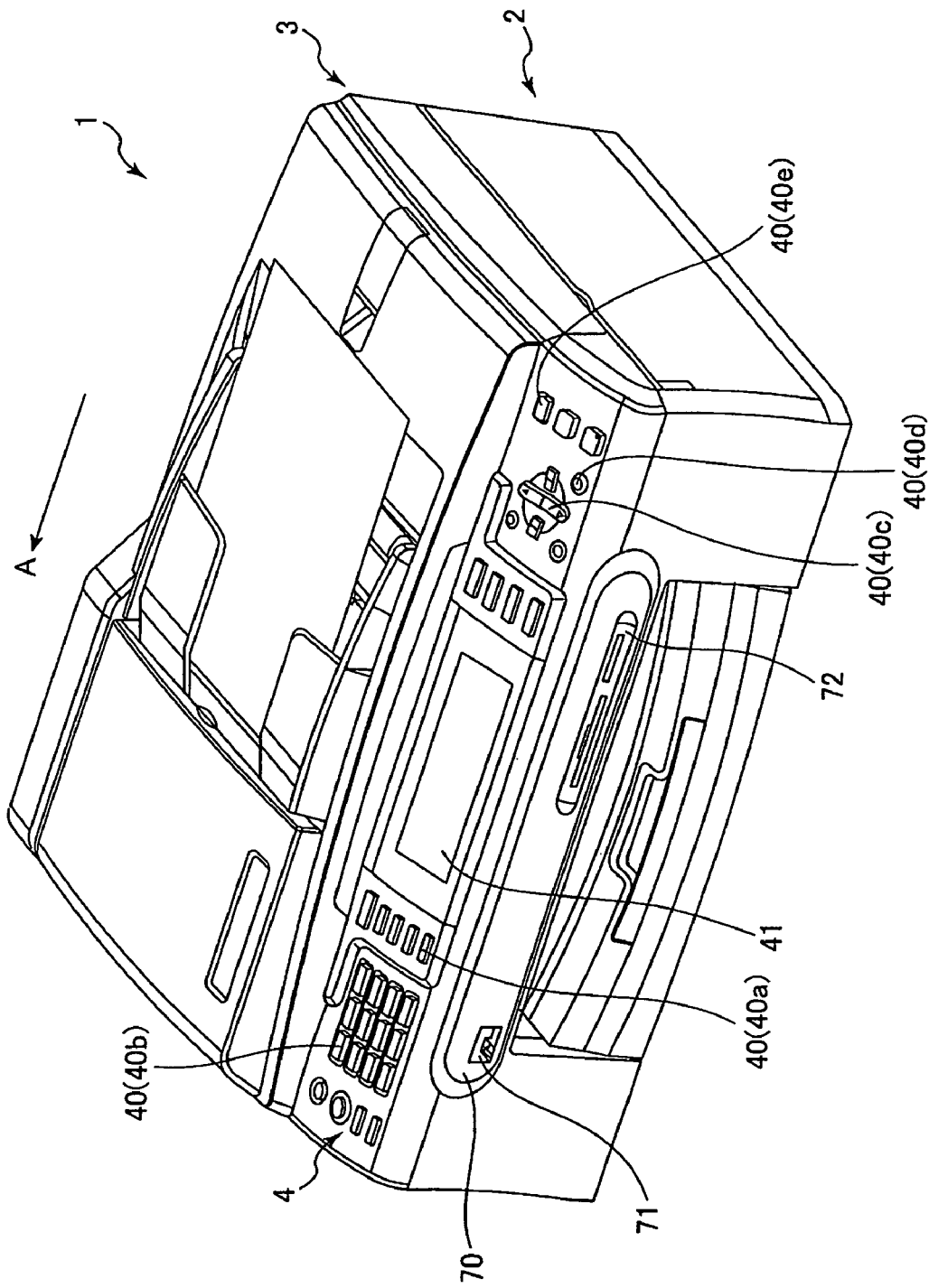
FIG. 1 is a perspective view showing the outer structure of a multifunction device.

Next, a preferred embodiment of the present invention will be described while referring to the accompanying drawings. FIG. 1 is a perspective view showing the outer structure of a multifunction device 1 according to the preferred embodiment. A feature of the multifunction device 1 is that the user can modify the order of thumbnail images [hereinafter also referred to simply as "thumbnails"] while viewing the original order of the thumbnail images.

As shown in FIG. 1, the multifunction device 1 is integrally configured of a printer 2 occupying the lower section, a scanner 3 occupying the upper section, and a control panel 4 provided on the front surface of the scanner 3. The multifunction device 1 has a scanner function, copier function, and facsimile function.

In addition to the above functions, the multifunction device 1 has a function for connecting to external devices, such as a USB memory device, a digital camera, and a personal computer and for recording data received from these external devices on a recording paper K; and a function for displaying data received from the external devices on a liquid crystal display (LCD) 41 provided on the control panel 4.

The control panel 4 is disposed on the front surface side of the multifunction device 1 and is used for operating the printer 2 and scanner 3. The control panel 4 includes various operating keys 40 (40*a*, 40*b*, 40*c*, 40*d*, and 40*e*), and the LCD 41.

The LCD 41 is rectangular in shape and elongated in the direction indicated by an arrow A in FIG. 1 (width direction of the multifunction device 1) and has a vertical-to-horizontal ratio of 3:8, where the width direction is the horizontal. More specifically, the LCD 41 is integrally configured of two independent rectangular LCDs having a vertical-to-horizontal ratio of 3:4 and juxtaposed in the direction A, although the LCD 41 is not shown to scale in FIG. 1.

The LCD 41 is also integrally configured of a touch panel well known in the art. By touching thumbnails, icons, and the like displayed on the LCD 41, the user can select such images and icons located at the touched coordinates of the LCD 41. In addition to touching a specific region of the display, the user can trace a desired path on the LCD 41, at which time the touch panel also recognizes the final coordinates in the path traced on the LCD 41.

When the user inputs a desired command into the multifunction device 1, a controller 20 (see FIG. 2) controls operations of the multifunction device 1 based on the inputted data. In addition to commands inputted via the control panel 4, the multifunction device 1 can be operated based on commands transmitted from a computer via a printer driver, scanner driver, and the like.

A connection panel 70 is provided below the control panel 4. A USB terminal 71 is provided in the left side of the connection panel 70. The USB terminal 71 allows the multifunction device 1 to be connected with a USB cable to an external device so that the external device and the multifunction device 1 can communicate with each other.

A slot section 72 is disposed in the right side of the connection panel 70. The slot section 72 is provided with a plurality of card slots in which memory cards (card-like memory) may be inserted. When a memory card is inserted into a card slot, the controller 20 described later can read image data from the memory card.

Figure 2:
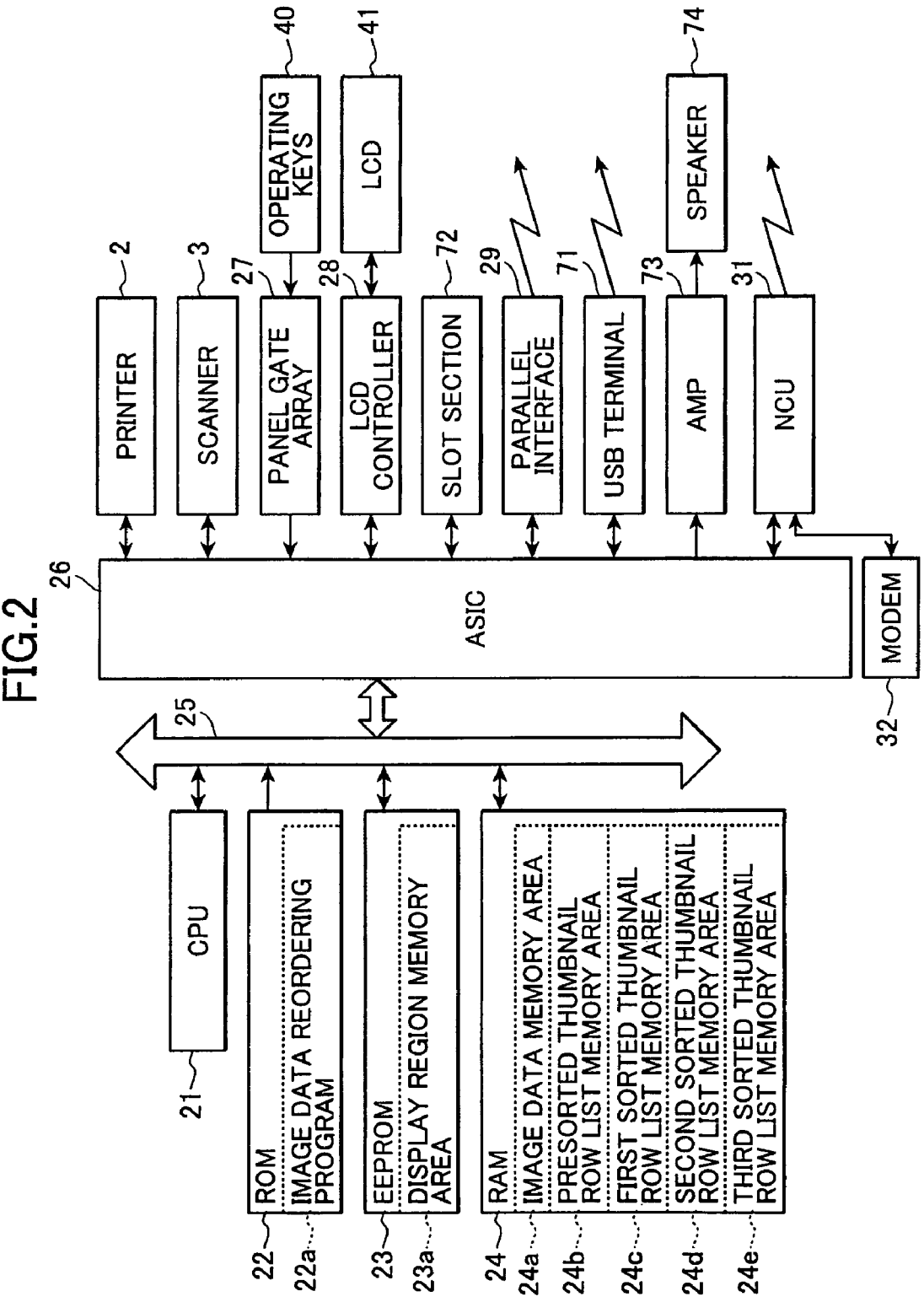
FIG. 2 is a block diagram showing the general structure of a controller in the multifunction device.

Next, the overall structure of the controller 20 that controls operations of the multifunction device 1 will be described with reference to FIG. 2. FIG. 2 is a block diagram showing the overall structure of the controller 20. The controller 20 controls overall operations of the multifunction device 1, including the printer 2, scanner 3, and control panel 4.

The controller 20 is configured of a microcomputer primarily including a central processing unit (CPU) 21, a read-only memory (ROM) 22, an electrically erasable programmable ROM (EEPROM) 23, and a random access memory (RAM) 24, all of which are connected to an application specific integrated circuit (ASIC) 26 via a bus 25.

The CPU 21 performs overall control of the multifunction device 1 based on programs stored in the ROM 22. The ROM 22 stores programs for controlling various operations of the multifunction device 1, including an image data reordering program 22*a* for implementing an image data reordering process shown in the flowchart of FIG. 3. The image data reordering process is performed to modify the order of a predetermined plurality of image data and to print, transmit via fax, save, or display the image data based on the modified order.

The EEPROM 23 is a rewritable nonvolatile memory and includes a display region memory area 23*a*. The display region memory area 23*a* stores display regions of thumbnails, icons, and the like displayed on the LCD 41 in association with their coordinates relative to the LCD 41.

The display region memory area 23*a* will be described here in greater detail with reference to FIG. 4(*c*) FIG. 4(*c*) shows a display of thumbnails in an initial display state. Displayed on the LCD 41, this thumbnail image display includes a row of thumbnails corresponding to image data arranged in the original unmodified order, and a row of the same thumbnails arranged in a modified order, enabling the user to modify the order of desired image data in the image data reordering process described later.

The presorted thumbnail row in the thumbnail image display includes a maximum of seven pages worth of thumbnails S in their original unmodified order juxtaposed horizontally beginning from the character string "Presorted." The display region for each of the seven pages worth of thumbnails S is stored in the display region memory area 23*a* in association with the corresponding coordinates on the LCD 41, enabling the multifunction device 1 to detect which of the display regions is touched.

The sorted thumbnail row is displayed below the presorted thumbnail row and also includes a maximum of seven pages worth of thumbnails S arranged horizontally in a modified order beginning from the character string "Sorted." The display region memory area 23a stores display regions at which each of the seven pages worth of thumbnails S is displayed in association with the corresponding coordinates on the LCD 41, enabling the multifunction device 1 to detect which of the display regions has been touched.

Horizontal scroll bars 50 and 52 and pointers 51 and 53 capable of moving along the respective scroll bars 50 and 52 are displayed above the presorted thumbnail row and below the sorted thumbnail row, respectively. The scroll bar 50 and pointer 51 are icons that accept instructions for scrolling the thumbnails S displayed in the presorted thumbnail row left and right, while the scroll bar 52 and pointer 53 are icons that accept instructions for scrolling the thumbnails S displayed in the sorted thumbnail row left and right.

The display region for the scroll bar 50 is divided uniformly in the longitudinal direction by the total number of presorted image data to be displayed, and each divided section of the display area is stored in the display region memory area 23a in association with the corresponding coordinates on the LCD 41. That is, the total length of the scroll bar 50 in the longitudinal direction corresponds to the total number of presorted images and indicates each page worth of data in order from the left side. For example, if the total number of presorted image data is 100 pages, the left longitudinal edge of the scroll bar 50 indicates the first page, the middle position indicates the fiftieth page, and the right edge indicates the one hundredth page.

Similarly, the display region for the scroll bar 52 is divided uniformly in the longitudinal direction by the total number of presorted image data to be displayed, and each divided section of the display area is stored in the display region memory area 23a in association with the corresponding coordinates on the LCD 41. That is, the total length of the scroll bar 52 in the longitudinal direction corresponds to the total number of presorted images and indicates each page worth of data in order from the left side. For example, if the total number of presorted image data is 10 pages, the left longitudinal edge of the scroll bar 50 indicates the first page, the middle position indicates the fifth page, and the right edge indicates the tenth page.

Group changing buttons 54a and 54b are displayed above the character string "Unmodified" and below the character string "Modified," respectively. The group changing buttons 54a and 54b are icons that accept instructions for changing the group of image data displayed in the sorted thumbnail row.

As will be described later, the image data displayed in the sorted thumbnail row in the preferred embodiment is divided into three groups (first through third groups). The user can switch the group displayed in the sorted thumbnail row by touching the group changing buttons 54a and 54b.

The display regions of the group changing buttons 54a and 54b are stored in the display region memory area 23a in association with the corresponding coordinates on the LCD 41, thereby enabling the multifunction device 1 to detect when one of the group changing buttons 54a and 54b has been touched.

The display region (space) above the presorted thumbnail row and not including the regions in which the group changing button 54a, scroll bar 50, and pointer 51 are displayed is a second group sorting region R1. The second group sorting region R1 is stored in the display region memory area 23a in association with its coordinates on the LCD 41, enabling the multifunction device 1 to detect when the second group sorting region R1 has been touched.

The display region (space) below the sorted thumbnail row and not including the regions in which the group changing button 54b, scroll bar 52, and pointer 53 are displayed is a third group sorting region R2. The third group sorting region R2 is stored in the display region memory area 23a in association with its coordinates on the LCD 41, enabling the multifunction device 1 to detect when the third group sorting region R2 has been touched.

The RAM 24 of the controller 20 shown in FIG. 2 is used as a storage area for temporarily storing various data used when the CPU 21 executes the above programs and as a work area for the CPU 21. The RAM 24 includes an image data memory area 24a, an presorted thumbnail row list memory area 24b, a first sorted thumbnail row list memory area 24c, a second sorted thumbnail row list memory area 24d, and a third sorted thumbnail row list memory area 24e.

The image data memory area 24a stores image data of thumbnail images displayed in the thumbnail image display. The image data stored in the image data memory area 24a is read from a memory card, internal memory such as the EEPROM 23, or the scanner 3.

The presorted thumbnail row list memory area 24b stores a list of image data for the presorted thumbnails row (as illustrated in the example of FIG. 4(a)). Thumbnails are displayed in the presorted thumbnail row according to this list of image data for the presorted thumbnail row.

The first sorted thumbnail row list memory area 24c stores a first list of image data for the sorted thumbnail row (as illustrated in the example of FIG. 4(b)). This first list of the sorted thumbnail row is a data list corresponding to thumbnails for image data belonging to the first group. The thumbnails are displayed in the sorted thumbnail row according to this first list of image data for the sorted thumbnail row.

The second sorted thumbnail row list memory area 24d stores a second list of image data for the sorted thumbnail row (as illustrated in the example of FIGS. 9(c1) and 9(c2)). This second list of image data for the sorted thumbnail row is a data list corresponding to thumbnails for image data belonging to the second group. The thumbnails are displayed in the sorted thumbnail row according to this second list of image data for the sorted thumbnail row.

The third sorted thumbnail row list memory area 24e stores a third list of image data for the sorted thumbnail row (as illustrated in the example of FIGS. 9(d1) and 9(d2)). This third list of image data for the sorted thumbnail row is a data list corresponding to thumbnails for image data belonging to the third group. The thumbnails are displayed in the sorted thumbnail row according to this third list of image data for the sorted thumbnail row.

The ASIC 26 controls operations of the printer 2, scanner 3, control panel 4, slot section 72, and the like based on instructions from the CPU 21.

The ASIC 26 is connected to a panel gate array 27 for receiving commands inputted from the operating keys 40, an LCD controller 28 for controlling the display on the LCD 41, a parallel interface 29, the USB terminal 71, and a speaker 74 via an amp 73. The ASIC 26 is also connected to a network control unit (NCU) 31, and a modem 32 is connected to the NCU 31.

Figure 3:
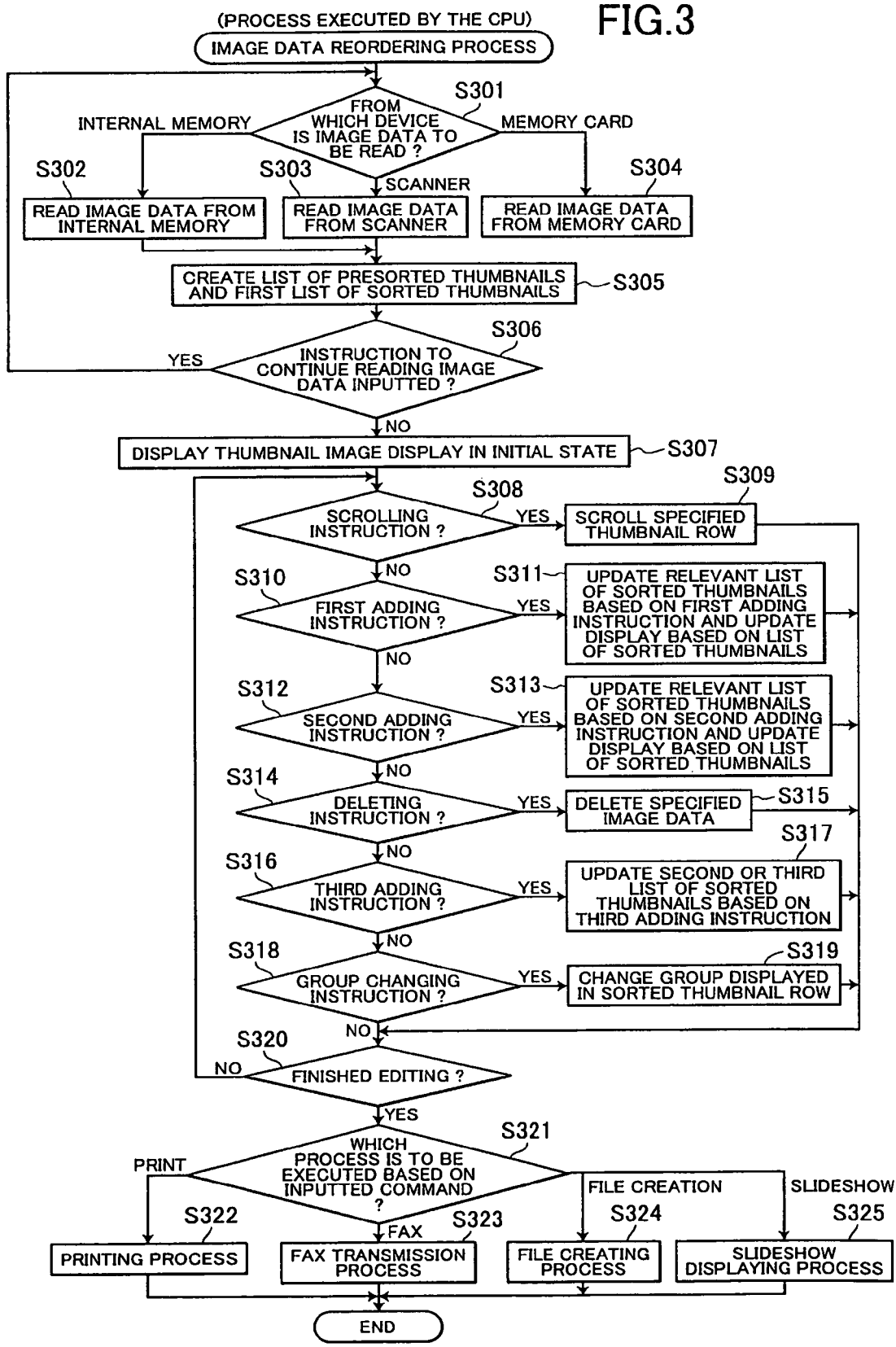
FIG. 3 is a flowchart illustrating steps in an image data reordering process.

Next, the image data reordering process will be described with reference to FIG. 3. FIG. 3 is a flowchart illustrating steps in the image data reordering process. This process serves to modify the order of a predetermined plurality of image data and to print, transmit via fax, save, or display the plurality of image data according to the modified order. The process is executed when the user inputs an execute instruction.

The user inputs an execute instruction by pressing a menu key 40a to display a menu on the LCD 41 and by selecting the image data reordering process from the menu using a selection key 40d, for example. At this time, the multifunction device 1 recognizes that the user has inputted an execute instruction and begins the main process. The multifunction device 1 may also execute the process upon receiving an instruction to display the menu from an external device connected to the multifunction device 1 via an interface. In the latter case, instructions in the following process are also received from the external device.

In S301 of the image data reordering process shown in FIG. 3, the CPU 21 determines from which device image data is to be read. Specifically, the CPU 21 displays on the LCD 41 a list of devices including internal memory, memory cards, a scanner, and external storage devices and external computers connected via interfaces, as well as a message requesting the user to select a desired device from the device list. When the user touches a desired device in the device list, the CPU 21 determines that the user has inputted an instruction to read image data from the device in the list that was touched. Devices from which image data can be read are not limited to the examples given here.

If the user inputted an instruction to read image data from internal memory (the EEPROM 23, for example), in S302 the CPU 21 reads image data from the internal memory and stores this data in the image data memory area 24a. If the user inputted an instruction to read image data from the scanner 3, in S303 the CPU 21 starts the scanner 3, reads image data scanned by the scanner 3, and stores the data in the image data memory area 24a. If the user inputted an instruction to read image data from a memory card, in S304 the CPU 21 reads image data from the memory card and stores this data in the image data memory area 24a.

In S305 the CPU 21 creates a list of presorted thumbnails (see FIG. 4(a)) from the image data stored in the image data memory area 24a, creates a first list of sorted thumbnails (see FIG. 4(b)), and stores these lists in the presorted thumbnail row list memory area 24b and first sorted thumbnail row list memory area 24c, respectively. At the same time, the CPU 21 assigns coordinates on the LCD 41 to each display region of the scroll bar 50 and scroll bar 52 based on the total number of image data and stores data correlating the coordinates and display regions in the display region memory area 23a.

Next, the list of presorted thumbnails and the list of sorted thumbnails will be described with reference to FIGS. 4(a) and 4(b). FIG. 4(a) conceptually illustrates the list of presorted thumbnails in an initial state, and FIG. 4(b) conceptually illustrates the first list of sorted thumbnails in its initial state.

In the preferred embodiment, the list of presorted thumbnails in its initial state and the first list of sorted thumbnails in its initial state are set to the same state. Consequently, thumbnail images in the presorted thumbnail row and thumbnail images in the sorted thumbnail row are displayed in the same initial state of the thumbnail image display shown in FIG. 4(c). Accordingly, the user can reorder thumbnail images in the sorted thumbnail row using the order of thumbnail images in the presorted thumbnail row. In the preferred embodiment, the thumbnail image display is initialized every time the image data memory area 24a stores image data.

Figure 4C:
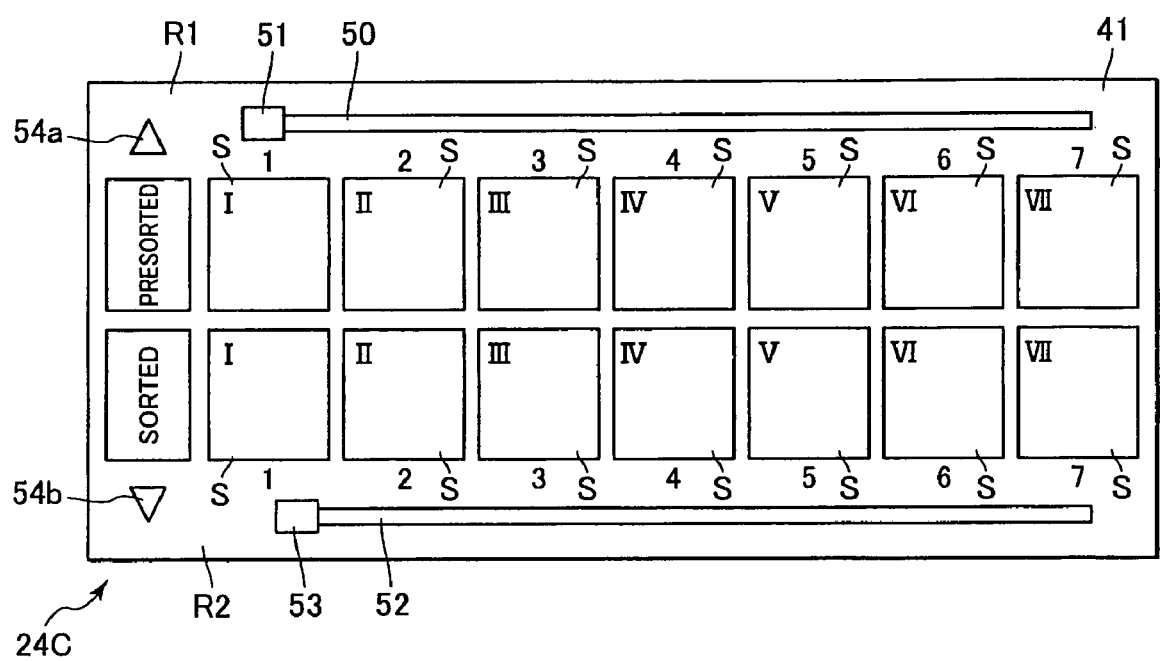
FIG. 4 is an explanatory diagram showing (a) a list of presorted thumbnails in its initial state, (b) a first list of sorted thumbnails in its initial state, and (c) [(b) again in the original] a thumbnail image display in its initial state.

The list of presorted thumbnails in the initial state shown in FIG. 4(a) is a data list for thumbnail images to be displayed in the presorted thumbnail row within the thumbnail image display of the initial state shown in FIG. 4(c). This list associates a presorted page number 55, an image filename 56, and an in-screen flag 57 with each thumbnail image (each image data).

The presorted page number 55 indicates the order of thumbnail images displayed in the presorted thumbnail row. This display order is determined based on prescribed data assigned to image data corresponding to each thumbnail image (modified date, filename, or data size, for example).

The image filename 56 indicates the filename of the image data corresponding to each thumbnail image. The image filename can be used to identify the image data corresponding to the thumbnail image. The in-screen flag 57 indicates whether the thumbnail image is displayed on the LCD 41 and is set to "1" when displayed and "0" when not displayed. In the initial state, the in-screen flag 57 is set to "1" for thumbnail images having a presorted page number 55 of 1-7.

Since the thumbnail images are displayed from left to right in the presorted thumbnail row in the increasing order of presorted page numbers 55 based on the setting status of the in-screen flag 57 in the preferred embodiment, the multifunction device 1 can identify a thumbnail image that is touched on the LCD 41.

For example, if the seventh display region from the left is touched in the presorted thumbnail row when the thumbnail image display is in the initial state shown in FIG. 4(c), the multifunction device 1 detects that this seventh display region from the left has been touched in the presorted thumbnail row based on coordinates stored in the display region memory area 23a. Subsequently, the multifunction device 1 can identify the thumbnail image touched on the LCD 41 as the seventh thumbnail image among thumbnail images having an in-screen flag 57 set to "1" in increasing order of the presorted page numbers 55 from the list of presorted thumbnails Shown in FIG. 4(a). In other words, the multifunction device 1 identifies the touched thumbnail image as that corresponding to image data having the image filename 56 "seven.pdf."

The first list of sorted thumbnails in its initial state shown in FIG. 4(b) is a data list for thumbnail images to be displayed in the sorted thumbnail row of the thumbnail image display for the initial state shown in FIG. 4(c). This list associates a sorted page number 58, a filename 59, a presorted page number 60, and an in-screen flag 61 with each thumbnail image.

The sorted page number 58 indicates the order of thumbnail images displayed in the sorted thumbnail row. The filename 59 indicates the filename of image data corresponding to each thumbnail image. The presorted page number 60 indicates the display order set for each thumbnail image in the initial state (the presorted page number set in the list of presorted thumbnails). The in-screen flag 61 indicates whether each thumbnail image is displayed on the LCD 41 and is set to "1" when displayed and "0" when not displayed.

As described above, since the thumbnail images are displayed from left to right in the sorted thumbnail row in increasing order of the sorted page numbers 58 based on the setting of the in-screen flags 61 in the preferred embodiment, the multifunction device 1 can identify the thumbnail image that is touched in the LCD 41.

Returning to the flowchart in FIG. 3, after the CPU 21 creates and stores the list of presorted thumbnails and the first list of sorted thumbnails in S305, in S306 the CPU 21 displays a message on the LCD 41 prompting the user to indicate whether to continue reading image data and determines whether an instruction to continue has been inputted by the user. If an instruction to continue has been inputted (S306: YES), the CPU 21 repeats the process from S301 and adds the data required for the newly read image data to the list of presorted thumbnails and the first list of sorted thumbnails. The CPU 21 also assigns coordinates on the LCD 41 to each display region of the scroll bars 50 and 52 based on the total number of image data and stores data correlating the coordinates and display regions in the display region memory area 23a.

However, if the user has inputted an instruction not to continue (S306: NO), in S307 the CPU 21 displays the thumbnail image display in the initial state on the LCD 41 (see FIG. 4(c)) based on the list of presorted thumbnails and the first list of sorted thumbnails. As described above, when menu commands are received from an external device or the like, data may be transmitted through the external device to be displayed on a display unit of the external device.

Here, the thumbnail image display for the initial state will be described with reference to FIG. 4(c). FIG. 4(c) shows the thumbnail image display in its initial state, displayed based on the list of presorted thumbnails shown in FIG. 4(a) and the first list of sorted thumbnails shown in FIG. 4(b).

In the thumbnail image display for the initial state, thumbnails S having an in-screen flag 57 set to "1" in the list of presorted thumbnails shown in FIG. 4(a) are displayed from left to right in the presorted thumbnail row in increasing order of the presorted page numbers 55. Further, roman numerals (I, II, III, . . . , and VII) corresponding to the presorted page number 55 of each thumbnail S is displayed in association with each thumbnail S displayed in the presorted thumbnail row.

In addition, thumbnails S having an in-screen flag 61 set to "1" in the first list of sorted thumbnails shown in FIG. 4(b) are displayed from left to right in the sorted thumbnail row in increasing order of the sorted page numbers 58. In addition, roman numerals corresponding to the presorted page number 60 of each thumbnails S are displayed in association with each thumbnails S displayed in the sorted thumbnail row. Displaying the roman numerals enables the user to quickly determine the display order (presorted page number) for the initial state of thumbnail images displayed in the sorted thumbnail row.

Icons for each of the scroll bars 50 and 52, pointers 51 and 53, and group changing buttons 54a and 54b are also displayed on the LCD 41 based on the coordinates stored in the display region memory area 23a. The present invention is not limited to any particular process for displaying the rows of thumbnail images. For example, the rows of images may be displayed by sequentially displaying each of the thumbnail images, or the rows of thumbnail images may be displayed all at once after creating image data for the rows of images.

Returning again to the flowchart in FIG. 3, after the thumbnail image display for the initial state has been displayed as described above, in S308 the CPU 21 determines whether a scrolling instruction has been received. If a scrolling instruction has been received (S308: YES), in S309 the CPU 21 scrolls the presorted thumbnail row or the sorted thumbnail row based on the instruction and subsequently advances to S320 described later.

Figure 5:
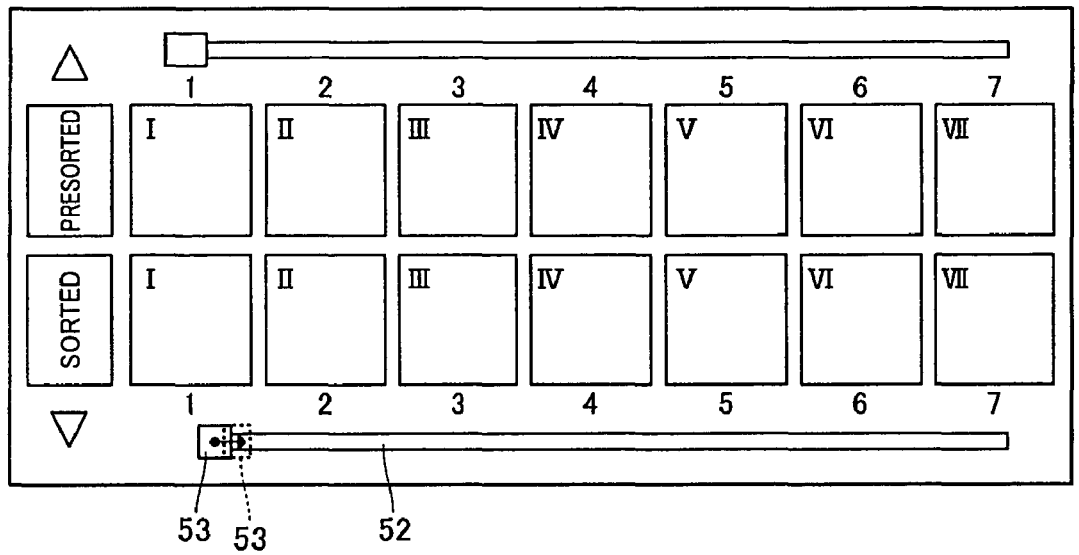
FIG. 5 is an explanatory diagram showing (a1) the thumbnail image display before scrolling, (a2) the thumbnail image display after scrolling, (b1) the first list of sorted thumbnails before scrolling, and (b2) [(a2) in the original] the first list of sorted thumbnails after scrolling.
Figure 5:
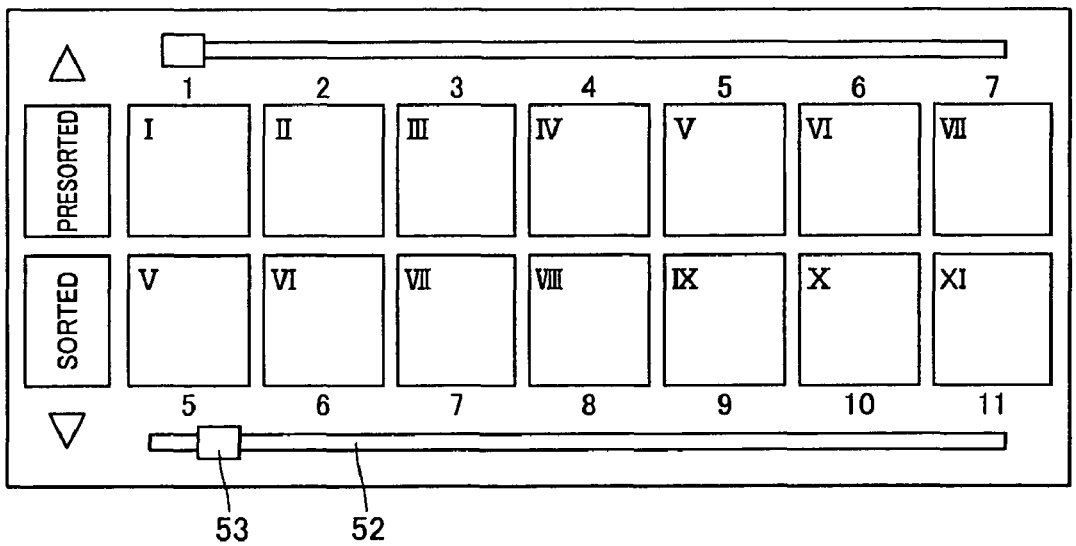

Here, the process for scrolling the sorted thumbnail row will be described with reference to FIG. 5. FIG. 5(a1) shows the thumbnail image display prior to scrolling, while FIG. 5(a2) shows the thumbnail image display after scrolling. FIG. 5(b1) is the first list of sorted thumbnails prior to scrolling, while FIG. 5(b2) is the first list of sorted thumbnails after scrolling.

As an example, the user touches the pointer 53 in the state shown in FIG. 5(a1) and slides the user's finger over the scroll bar 52 before lifting the finger from the LCD 41 at a desired position on the scroll bar 52. At this time, the CPU 21 determines that a scrolling instruction has been received and detects the coordinates at which the user's finger separated from the LCD 41. If the coordinates correspond to the fifth page of sorted image data in the display region memory area 23a, the CPU 21 updates the first list of sorted thumbnails to the state shown in FIG. 5(b2).

Specifically, thumbnail images having sorted page numbers 58 set to 1-7 in the first list of sorted thumbnails shown in FIG. 5(b) prior to scrolling have an in-screen flag 61 set to "1". After scrolling, the in-screen flags 61 corresponding to sorted page numbers 58 "1-4" are set to "0" and the in-screen flags 61 corresponding to sorted page numbers 58 "8-11" are set to "1", as shown in FIG. 5(b2).

Subsequently, the thumbnail image display is modified from the state shown in FIG. 5(a1) to the state shown in FIG. 5(a2) according to the first list of sorted thumbnails updated in FIG. 5(b2). In other words, the thumbnail images displayed in the sorted thumbnail row of FIG. 5(a1) are scrolled four pages to the left, and the seven pages of thumbnails S having sorted page numbers 58 "5-11" (roman numerals V-XI) are displayed in order of increasing sorted page numbers 58 from left to right in the sorted thumbnail row, as shown in FIG. 5(a2).

Similarly, if the user were to touch the pointer 51 with a finger and slide the finger over the scroll bar 50 and subsequently remove the finger at a desired position on the scroll bar 50, as described above, the CPU 21 updates the in-screen flags 57 in the list of presorted thumbnails and scrolls the images displayed in the presorted thumbnail row based on these in-screen flags 57. Accordingly, the user can easily rearrange the order of the presorted image data by scrolling each thumbnail row (unmodified and sorted thumbnail rows).

Returning again to the flowchart in FIG. 3, if the CPU 21 determines in S308 that a scrolling instruction was not received (S308: NO), then in S310 the CPU 21 determines whether a first adding instruction has been received for adding desired image data from the presorted image data to the sorted image data in a desired order. If the CPU 21 determines that a first adding instruction has been received (S310: YES), then in S311 the CPU 21 updates the corresponding list of sorted thumbnails from among the first through third lists based on the first adding instruction and updates the display in the sorted thumbnail row based on the updated list of sorted thumbnails. Subsequently, the CPU 21 advances to S320 described later. In S311 the CPU 21 also assigns coordinates on the LCD 41 to the display region of the scroll bar 52 based on the total number of image data and stores data correlating the coordinates and display region in the display region memory area 23a.

Here, the process for adding desired image data from the presorted image data to the sorted image data in a prescribed order will be described with reference to FIG. 6. FIG. 6(a1) shows the thumbnail image display prior to adding image data, while FIG. 6(a2) shows the thumbnail image display after adding image data. FIG. 6(b1) is the first list of sorted thumbnails prior to adding an image, while FIG. 6(b2) is the first list of sorted thumbnails after adding an image.

As an example, the user touches the second display region from the left in the presorted thumbnail row shown in FIG. 6(a1) with a finger, traces a desired path indicated by the arrow in FIG. 6(a1), and releases the finger at the third display region from the left in the sorted thumbnail row.

In this example, the CPU 21 detects that the second display region from the left in the presorted thumbnail row was touched based on the coordinates stored in the display region memory area 23a. Subsequently, the CPU 21 identifies the second thumbnail image in increasing order of presorted page numbers 55 from among thumbnail images having the in-screen flag 57 set to "1" from the list of presorted thumbnails Shown in FIG. 4(a). In other words, the multifunction device 1 identifies the touched thumbnail image as a thumbnail image for image data having the presorted page number 55 "2" and the image filename 56 "b2b2.pdf."

When the CPU 21 subsequently detects that the user's finger separated from the LCD 41 at the third display region from the left in the sorted thumbnail row based on coordinates stored in the display region memory area 23a, the CPU 21 identifies the sorted page number 58 "7" for the third thumbnail image from images having an in-screen flag 61 set to "1" in the first list of sorted thumbnails shown in FIG. 6(b1) in increasing order of the sorted page numbers 58.

Accordingly, the CPU 21 determines that an instruction has been received to add image data having the presorted page number 55 "2" and the image filename 56 "b2b2.pdf" from the presorted image data to the sorted image data as image data having the sorted page number 58 "7". Based on this instruction, the CPU 21 modifies the first list of sorted thumbnails to that shown in FIG. 6(b2).

More specifically, the list shown in FIG. 6(b1) has the filename 59 set to "seven.pdf," the presorted page number 60 set to "7 (VII)," and the in-screen flag 61 set to "1" for the sorted page number 58 of "7". The CPU 21 updates the filename 59 to "b2b2.pdf," the presorted page number 60 to "2 (II)," and the in-screen flag 61 to "1" for the sorted page number 58 of "7", as shown in FIG. 6(b2). In addition, the CPU 21 updates records in the list having a sorted page number 58 of "8" or greater in FIG. 6(b1) to correspond to records having a sorted page number 58 of "7" or greater in FIG. 6(b1) prior to modification.

Next, the CPU 21 updates the thumbnail image display from the state shown in FIG. 6(a1) to the state shown in FIG. 6(a2) according to the first list of sorted thumbnails updated in FIG. 6(b2). In other words, the CPU 21 inserts the thumbnail S with roman numeral II into the third display region from the left in the sorted thumbnail row, as shown in FIG. 6(a2). At the same time, the CPU 21 shifts the thumbnails S with roman numerals VII-X in the third through sixth display regions from the left of the sorted thumbnail row shown in FIG. 6(a1) to the fourth through seventh display regions from the left of the sorted thumbnail row, as shown in FIG. 6(a2), while removing the thumbnail S with roman numeral XI displayed in the seventh display region from the left in the sorted thumbnail row shown in FIG. 6(a1) from the display.

Since the thumbnail images in the presorted thumbnail row remain displayed in their original state at this time, the user can modify the original order of thumbnail images while viewing the original order.

Returning again to the flowchart in FIG. 3, if the CPU 21 determines in S310 that a first adding instruction was not received (S310: NO), then in S312 the CPU 21 determines whether a second adding instruction has been received for adding desired image data from the sorted image data to a desired position in the sorted image data. If the CPU 21 determines that a second adding instruction has been received (S312: YES), then in S313 the CPU 21 updates the relevant list of sorted thumbnails from among the first through third lists based on the second adding instruction and updates the display in the sorted thumbnail row based on the updated list of sorted thumbnails. Subsequently, the CPU 21 advances to S320 described later. In S313 the CPU 21 also assigns coordinates on the LCD 41 to the display region of the scroll bar 52 based on the total number of image data and stores data correlating the coordinates and display region in the display region memory area 23a.

Here, the process for adding desired image data from the sorted image data to a desired position in the sorted image data will be described with reference to FIG. 7. FIG. 7(a1) shows the thumbnail image display prior to adding an image, while FIG. 7(a2) shows the thumbnail image display after adding an image. FIG. 7(b1) is the first list of sorted thumbnails prior to adding an image, while FIG. 7(b2) is the first list of sorted thumbnails after adding an image.

As an example, the user touches the fifth display region from the left in the sorted thumbnail row shown in FIG. 7(a1) with a finger, slides the finger along a desired path indicated by the arrow in FIG. 7(a1), and releases the finger at the sixth display region from the left in the sorted thumbnail row.

In this example, the CPU 21 detects that the fifth display region from the left in the sorted thumbnail row was touched based on the coordinates stored in the display region memory area 23a. Subsequently, the CPU 21 identifies the fifth thumbnail image having an in-screen flag 57 set to "1" from the first list of sorted thumbnails shown in FIG. 7(b1) in increasing order of the sorted page numbers 58. Specifically, the CPU 21 identifies the touched thumbnail image as the thumbnail image for image data having the sorted page number 58 "9" and the filename 59 "333c.pdf."

When the CPU 21 subsequently detects that the user's finger separated from the LCD 41 at the sixth display region from the left in the sorted thumbnail row based on coordinates stored in the display region memory area 23a, the CPU 21 references the first list of sorted thumbnails shown in FIG. 7(b1) to find the sixth thumbnail image having an in-screen flag 61 set to "1" in increasing order of the sorted page numbers 58, and determines that the sorted page number 58 corresponding to this thumbnail image is "10".

In this way, the CPU 21 determines that a second adding instruction has been received for shifting the ninth page of image data in the sorted image data to the tenth page. Accordingly, the CPU 21 updates the first list of sorted thumbnails from that shown in FIG. 7(b1) to that shown in FIG. 7(b2) based on this second adding instruction.

More specifically, in the record of data having a sorted page number 58 of "10" shown in FIG. 7(b1), the filename 59 is set to "nine.pdf," the presorted page number 60 to "9 (IX)," and the in-screen flag 61 to "1". The CPU 21 modifies this record with the sorted page number 58 of "10" so that the filename 59 is "333c.pdf," the presorted page number 60 is "3 (III)," and the in-screen flag 61 is "1", as shown in FIG. 7(b2). In addition, the CPU 21 updates records in the list having a sorted page number 58 of "11" or greater in FIG. 7(b1) to correspond to records having a sorted page number 58 of "10" or greater in FIG. 7(b1).

Next, the CPU 21 updates the thumbnail image display from the state shown in FIG. 7(a1) to the state shown in FIG. 7(a2) according to the first list of sorted thumbnails updated in FIG. 7(b2). In other words, the CPU 21 shifts the thumbnail S with roman numeral III to the sixth display region from the left in the sorted thumbnail row, as shown in FIG. 7(a2). At the same time, the CPU 21 displays the thumbnails S having roman numeral IX displayed in the sixth display region from the left of the sorted thumbnail row shown in FIG. 7(a1) in the seventh display region from the left, as shown in FIG. 7(a2), while removing the thumbnail S with roman numeral X displayed in the seventh display region from the left in the sorted thumbnail row shown in FIG. 7(a1) from the display.

Since the thumbnail images in the presorted thumbnail row remain displayed in their original state at this time, the user can modify the original order of thumbnail images while viewing the original order.

Returning again to the flowchart in FIG. 3, if the CPU 21 determines in S312 that a second adding instruction was not received (S312: NO), then in S314 the CPU 21 determines whether a deleting instruction has been received for deleting desired image data from the sorted image data. If the CPU 21 determines that a deleting instruction has been received (S314: YES), then in S315 the CPU 21 updates the relevant list of sorted thumbnails from among the first through third lists based on the deleting instruction and updates the display in the sorted thumbnail row based on the updated list of sorted thumbnails. Subsequently, the CPU 21 advances to S320 described later. In S315 the CPU 21 also assigns coordinates on the LCD 41 to the display region of the scroll bar 52 based on the total number of image data and stores data correlating the coordinates and display region in the display region memory area 23*a*.

Figure 8:
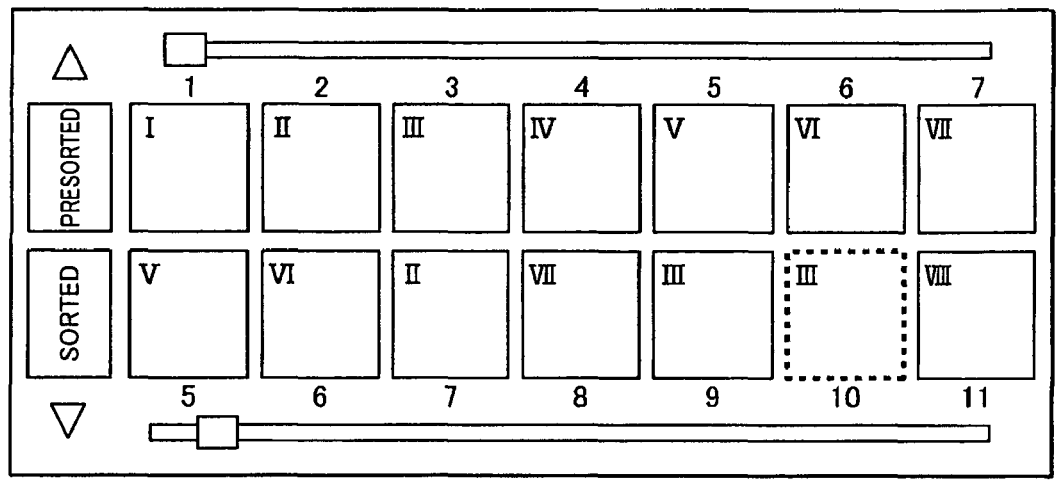
FIG. 8 is an explanatory diagram showing (a1) the thumbnail image display before deleting an image, (a2) the thumbnail image display after deleting an image, (b1) the first list of sorted thumbnails before deleting an image, and (b2) the first list of sorted thumbnails after deleting an image.
Figure 8:
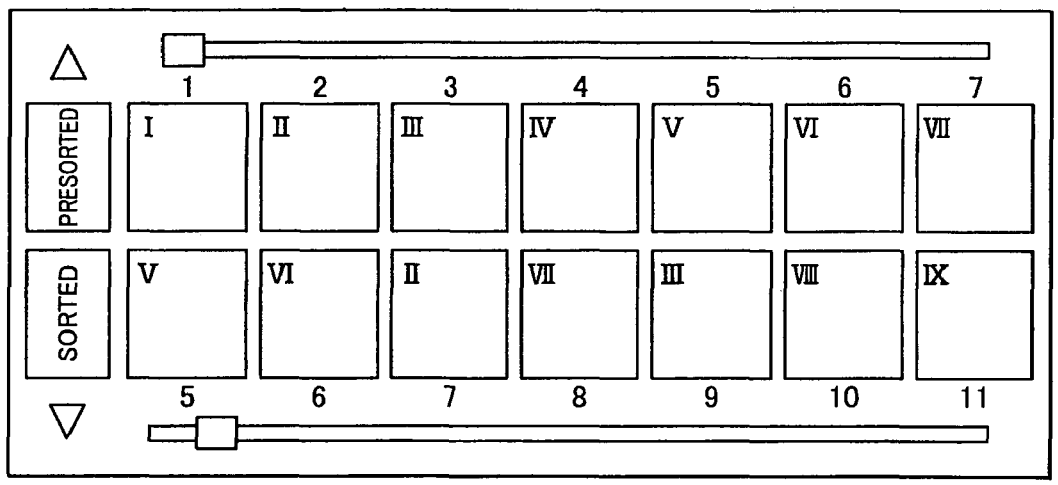

Here, the process for deleting a desired image from the sorted image data will be described with reference to FIG. 8. FIG. 8(*a*1) shows the thumbnail image display prior to deleting an image, while FIG. 8(*a*2) shows the thumbnail image display after deleting an image. FIG. 8(*b*1) is the first list of sorted thumbnails prior to deleting an image, while FIG. 8(*b*2) is the first list of sorted thumbnails after deleting an image.

As an example, the user successively touches the sixth display region from the left in the sorted thumbnail row shown in FIG. 8(*a*1). In this example, the CPU 21 detects that the sixth display region from the left in the sorted thumbnail row was touched based on the coordinates stored in the display region memory area 23*a*. Subsequently, the CPU 21 identifies the sixth thumbnail image having an in-screen flag 61 set to "1" from the first list of sorted thumbnails Shown in FIG. 8(*b*1) in increasing order of the sorted page numbers 58. Specifically, the CPU 21 identifies the touched thumbnail image as the thumbnail image for image data having the sorted page number 58 "10" and the filename 59 "333c.pdf." Thereafter, the CPU 21 detects that the sixth display image from the left in the sorted thumbnail row was touched again based on the coordinates stored in the display region memory area 23*a*.

In this way, the CPU 21 determines that an instruction was received for deleting the tenth page of image data from the sorted image data. Accordingly, the CPU 21 updates the first list of sorted thumbnails from that shown in FIG. 8(*b*1) to that shown in FIG. 8(*b*2) based on this deleting instruction.

More specifically, in the record of data having a sorted page number 58 of "10" shown in FIG. 8(*b*1), the filename 59 is set to "333c.pdf," the presorted page number 60 to "3 (III)," and the in-screen flag 61 to "1". The CPU 21 modifies this record with the sorted page number 58 of "10" so that the filename 59 is "eight.pdf," the presorted page number 60 is "8 (VIII)," and the in-screen flag 61 is "1", as shown in FIG. 8(*b*2). In addition, the CPU 21 updates records in the list having a sorted page number 58 of "11" or greater in FIG. 8(*b*1) to correspond to records having a sorted page number 58 of "10" or greater.

Next, the CPU 21 updates the thumbnail image display from the state shown in FIG. 8(*a*1) to the state shown in FIG. 8(*a*2) according to the first list of sorted thumbnails updated in FIG. 8(*b*2). In other words, the CPU 21 deletes the thumbnail S with roman numeral III in the sixth display region from the left in the sorted thumbnail row shown in FIG. 8(*a*1), shifts the thumbnails S having roman numeral VIII from the seventh display region to the sixth display region from which the previous thumbnails S was deleted, and newly displays the thumbnails S having roman numeral IX in the vacated seventh display region.

Since the thumbnail images in the presorted thumbnail row remain displayed in their original state at this time, the user can modify the original order of thumbnail images while viewing the original order.

Returning again to the flowchart in FIG. 3, if the CPU 21 determines in S314 that a deleting instruction was not received (S314: NO), then in S316 the CPU 21 determines whether a third adding instruction has been received for adding desired image data from the presorted image data to a different group. If the CPU 21 determines that a third adding instruction has been received (S316: YES), then in S317 the CPU 21 updates the second or third list of sorted thumbnails based on the third adding instruction, and subsequently advances to S320 described later. In S317 the CPU 21 also assigns coordinates on the LCD 41 to the display region of the scroll bar associated with the second or third group and stores data correlating the coordinates and display region in the display region memory area 23*a*.

Here, the process for adding desired image data from the presorted image data to a different group will be described with reference to FIG. 9. FIG. 9(*a*) shows the state of the thumbnail image display when thumbnail images for image data belonging to the first group are displayed in the sorted thumbnail row. FIG. 9(*b*) is the first list of sorted thumbnails. FIG. 9(*c*1) is a second list of sorted thumbnails prior to adding an image. FIG. 9(*c*2) is the second list of sorted thumbnails after adding an image. FIG. 9(*d*1) is a third list of sorted thumbnails prior to adding an image. FIG. 9(*d*2) is the third list of sorted thumbnails after adding an image.

First, the process for adding desired image data from the presorted image data to the second group will be described. As an example, the user touches the second display region from the left in the presorted thumbnail row shown in FIG. 9(*a*) with a finger, traces a desired path with the finger indicated by the arrow in FIG. 9(*a*), and removes the finger at a position in the second group sorting region R1 on the LCD 41. In the example shown in FIG. 9(*a*), the pointer 53 that moves along the scroll bar 52 is not displayed since there are seven or less thumbnail images in the sorted thumbnail row, enabling the user to determine at a glance that there are seven or less image data corresponding to thumbnail images displayed in the sorted thumbnail row.

In this example, the CPU 21 detects that the second display region from the left in the presorted thumbnail row has been touched based on the coordinates stored in the display region memory area 23*a*. Subsequently, the CPU 21 identifies the second thumbnail image having an in-screen flag 57 of "1" from among the list of presorted thumbnails shown in FIG. 4(*b*) based on the increasing order of presorted page numbers 55. Specifically, the CPU 21 identifies the thumbnail image corresponding to image data having the image filename 56 "b2b2.pdf."

Next, the CPU 21 detects that the user's finger separated from the LCD 41 at a position in the second group sorting region R1 based on the coordinates stored in the display region memory area 23*a*, at which time the CPU 21 determines that an instruction has been received to add the second image data in the presorted image data to the second group. Accordingly, the CPU 21 updates the second list of sorted thumbnails from that in FIG. 9(*c*1) to that in FIG. 9(*c*2) according to this instruction.

Specifically, the image data specified for addition to the second group is added to the lowest unoccupied position in the preferred embodiment. Hence, as indicated in FIG. 9(*c*2), the image data is added with a sorted page number 62 set to "5", a filename 63 set to "b2b2.pdf," a presorted page number 64 set to "2 (II)," and an in-screen flag 65 set to "1". In this way, the user can easily add desired image data from the presorted image data to the second group, which is separate from the first group.

Next, the process for adding desired image data from the presorted image data to the third group will be described. As an example, the user touches the fifth display region from the left in the presorted thumbnail row shown in FIG. 9(*a*) with a finger, traces a desired path with the finger indicated by the arrow in FIG. 9(a), and removes the finger at a position in the third group sorting region R2 on the LCD 41.

In this example, the CPU 21 detects that the fifth display region from the left in the presorted thumbnail row has been touched based on the coordinates stored in the display region memory area 23a. Subsequently, the CPU 21 identifies the fifth thumbnail image having an in-screen flag 57 of "1" from among the list of presorted thumbnails shown in FIG. 4(b) based on the increasing order of presorted page numbers 55. Specifically, the CPU 21 identifies the thumbnail image corresponding to image data having the image filename 56 "V.pdf."

Next, the CPU 21 detects that the user's finger separated from the LCD 41 at a position in the third group sorting region R2 based on the coordinates stored in the display region memory area 23a, at which time the CPU 21 determines that an instruction has been received to add the fifth image in the presorted image data to the third group. Accordingly, the CPU 21 updates the third list of sorted thumbnails from that in FIG. 9(d1) to that in FIG. 9(d2) according to this instruction.

Specifically, the image data specified for addition to the third group is added to the lowest unoccupied position in the preferred embodiment. Hence, as indicated in FIG. 9(d2), the image data is added with a sorted page number 66 set to "5", a filename 67 set to "V.pdf," a presorted page number 68 set to "5 (V)," and an in-screen flag 69 set to "1". In this way, the user can easily add desired image data from the presorted image data to the third group, which is separate from the first group.

Returning again to the flowchart in FIG. 3, if the CPU 21 determines in S316 that a third adding instruction was not received (S316: NO), then in S318 the CPU 21 determines whether a group changing instruction for changing the group displayed in the sorted thumbnail row has been received. If a group changing instruction has been received (S318: YES), then in S319 the CPU 21 changes the group displayed in the sorted thumbnail row according to the instruction.

Figure 10A:
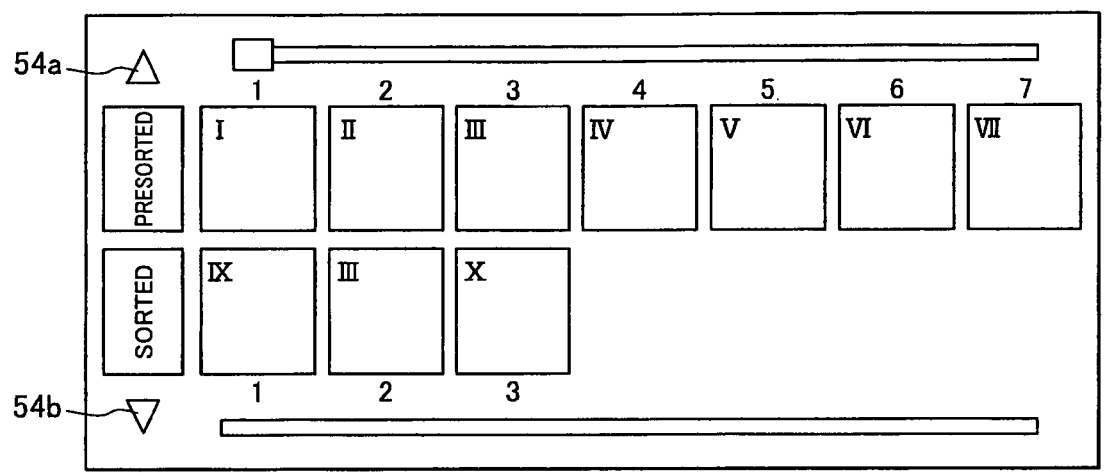
FIG. 10 is an explanatory diagram showing (a) the thumbnail image display when displaying thumbnails for image data belonging to the first group in the sorted thumbnail row, (b) the thumbnail image display when displaying thumbnails for image data belonging to a second group in the sorted thumbnail row, and (c) the thumbnail image display when displaying thumbnails for image data belonging to a third group in the sorted thumbnail row.
Figure 10B:
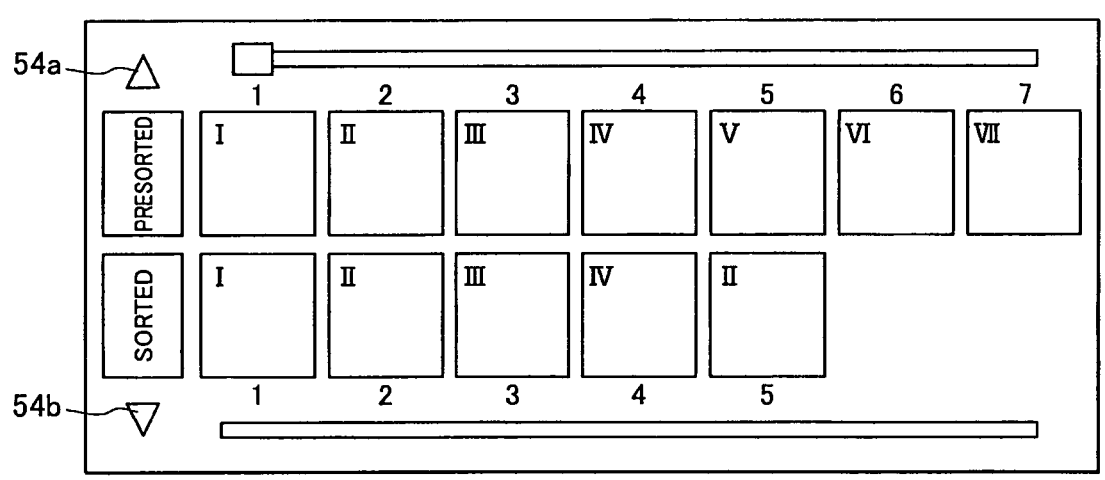
Figure 10C:
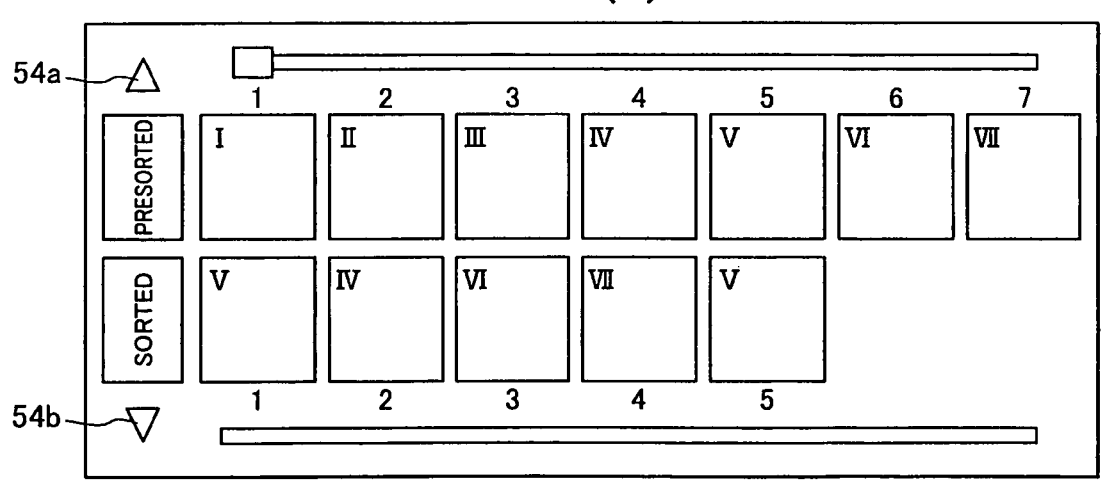

Here, the process for changing the group displayed according to the sorted thumbnail row will be described with reference to FIG. 10. FIG. 10(a) shows the state of the thumbnail image display when thumbnail images for image data belonging to the first group are displayed in the sorted thumbnail row. FIG. 10(b) shows the state of the thumbnail image display when thumbnail images for image data belonging to the second group are displayed in the sorted thumbnail row. FIG. 10(c) shows the state of the thumbnail image display when thumbnail images for image data belonging to the third group are displayed in the sorted thumbnail row.

First, a process will be described for changing the thumbnail image display from the state shown in FIG. 10(a) to the state shown in FIG. 10(b), that is, when changing the group displayed in the sorted thumbnail row from the first group to the second group.

In this example, the CPU 21 detects that the user has touched the group changing button 54b when the thumbnail image display is in the state shown in FIG. 10(a). After the user performs this operation, the CPU 21 determines that an instruction has been received to display thumbnail images in the sorted thumbnail row corresponding to image data belonging to the second group, which is next in order from the first group.

Next, the CPU 21 switches the sorted thumbnail row to display thumbnail images of image data belonging to the second group, as shown in FIG. 10(b), according to the second list of sorted thumbnails Stored in the second sorted thumbnail row list memory area 24d (see FIG. 9(c2)).

Next, a process will be described for changing the thumbnail image display from the state shown in FIG. 10(b) to the state shown in FIG. 10(c), that is, when changing the group displayed in the sorted thumbnail row from the second group to the third group.

In this example, the CPU 21 detects that the user has touched the group changing button 54b when the thumbnail image display is in the state shown in FIG. 10(b). After the user performs this operation, the CPU 21 determines that an instruction has been received to display thumbnail images in the sorted thumbnail row corresponding to image data belonging to the third group, which is next in order from the second group.

Next, the CPU 21 switches the sorted thumbnail row to display thumbnail images of image data belonging to the third group, as shown in FIG. 10(c), according to the third list of sorted thumbnails Stored in the third sorted thumbnail row list memory area 24e (see FIG. 9(d2)).

The user can switch the thumbnail image display from that shown in FIG. 10(c) to that shown in FIG. 10(b) by touching the group changing button 54a and can switch from the state shown in FIG. 10(b) to that shown in FIG. 10(c) by touching the group changing button 54b. Hence, the user can easily switch the group of image data displayed in the sorted thumbnail row through a single operation.

Returning again to the flowchart in FIG. 3, if the CPU 21 determines in S318 that a group changing instruction was not received (S318: NO), then in S320 the CPU 21 determines whether the user has finished editing. Specifically, a Finished Editing icon including the characters string "Finished Editing" (not shown) is displayed in the thumbnail image display, and the CPU 21 determines whether the user has touched this Finished Editing icon. If the user has touched the Finished Editing icon (S320: NO), then the CPU 21 repeats the process from S308.

However, if the user has touched the finished editing icon (S320: YES), in S321 the CPU 21 determines whether the user has inputted an instruction to execute a prescribed process. More specifically, the CPU 21 displays on the LCD 41 a list of the first through third groups with a message prompting the user to select one of the groups, and a list of processes including a printing process, facsimile transmission process, file creating process, and slideshow display process, together with a message prompting the user to select one of the processes in the list. After displaying this data on the LCD 41, the CPU 21 determines whether the user has selected a group from the group list and a process from the process list.

If the user selects a desired group and the printing process (S321: print), in S322 the CPU 21 executes a process to print image data belonging to the selected group according to the currently specified order, and subsequent ends the image data reordering process. If the user selects a desired group and the facsimile transmission process (S321: fax), in S323 the CPU 21 executes a facsimile transmission process to transmit via fax image data belonging to the selected group according to the currently specified order, and subsequent ends the image data reordering process.

If the user selects a desired group and the file creating process (S321: file), in S324 the CPU 21 executes a file creating process to create and save a single file including all image data belonging to the selected group according to the currently specified order, and subsequent ends the image data reordering process. If the user selects a desired group and the slideshow display process (S321: slideshow), in S325 the CPU 21 executes a slideshow display process to display a slide show of the image data belonging to the selected group according to the currently specified order, and subsequent ends the image data reordering process. Through this process, the multifunction device 1 can print, transmit via fax, save, and display image data according to the order arranged in each group, as the user desires.

While the invention has been described in detail with reference to specific embodiments thereof, it would be apparent to those skilled in the art that many modifications and variations may be made therein without departing from the spirit of the invention, the scope of which is defined by the attached claims.

While lists are used for managing the display order of thumbnail images and the like in the preferred embodiment, a method of management that does not use lists may also be employed. The format of the lists used is also not limited to the examples in the embodiment. For example, the presorted page number and sorted page number may be provided on separate lists and indirectly associated based on the image file name.

In the preferred embodiment, the sorted thumbnail row is set to the same state as the presorted thumbnail row in the initial state of the thumbnail image display shown in FIG. 4(*c*). However, it is also possible to display only the presorted thumbnail row in the initial state of the thumbnail image display, without displaying any thumbnail images in the display region corresponding to the modify thumbnail row. In this case, the first list of sorted thumbnails Shown in FIG. 4(*b*) stores no data at this time. This arrangement allows the user to more freely rearrange the order of sorted image data.

Further, in the preferred embodiment image data to be displayed in the sorted thumbnail row is sorted among first through third groups, but the number of groups is not limited to three and may be one group, two groups, and four or more groups. In such cases, a region for each group allowing the user to add images to that group should be allocated in the thumbnail image display on the LCD 41. Rather than allocating regions in the LCD 41 for adding images to each group, key operations may be configured for sorting images among groups, as well as for specifying the order of images in each group.

In the preferred embodiment described above, an image added to sorted image data is inserted before an image corresponding to the display region at which the user's finger separated from the LCD 41. However, the present invention is not limited to this method of assigning display regions on the LCD 41 to indicate the order of sorted image data. For example, the multifunction device 1 may be configured to add new image data between two adjacent thumbnail images when the user's finger last touches a display region between the thumbnail images.

The user may also be allowed to input a number to indicate the position in the display order of a thumbnail image after selecting the thumbnail image to be rearranged.

Further, while a touch panel is used in the preferred embodiment to identify a display region on the LCD 41 touched by the user, the present invention is not limited to a touch panel method in which the user directly touches the LCD 41, but may employ a touch panel capable of detecting coordinates on the LCD 41 based on physical proximity to the LCD 41 or the like.

The multifunction device 1 may also be provided with a network interface for connecting to an external computer or other external device via a network.

What is claimed is:

1. An image-displaying device comprising:
a storing unit configured to store first correlation data and second correlation data, the first correlation data indicating a plurality of first thumbnails and also indicating a sequence of the plurality of first thumbnails, the second correlation data indicating a plurality of second thumbnails and also indicating a sequence of the plurality of second thumbnails; a displaying unit including a first display configured to display at least two of the plurality of first thumbnails, which are different from one another, as a plurality of first display thumbnails based on the first correlation data, and a second display configured to display at least two of the plurality of second thumbnails, which are different from one another, as a plurality of second display thumbnails based on the second correlation data; an initializing unit configured to initialize the first correlation data and the second correlation data, such that the second correlation data includes the first correlation data and causes the second display to display the plurality of second display thumbnails, which are the same as the plurality of first display thumbnails displayed by the first display and, which are displayed in the same order as the plurality of first display thumbnails; and
an update controlling unit configured to receive an update instruction and, in response to receiving the update instruction, to update the second correlation data while maintaining the initial first correlation data, such that the second display changes the plurality of second display thumbnails based on the updated second correlation data and such that the first display maintains the displayed plurality of first thumbnails,
wherein the update controlling unit is configured to update the updated second correlation data in response to receiving a further updated instruction and to maintain the initial first correlation data, such that the second display further changes the plurality of second display thumbnails based on the updated second correlation data and the first display further maintains the displayed plurality of first thumbnails based on the maintained initial first correlation data.

2. The image-displaying device according to claim 1, wherein the first display includes a plurality of first display regions in which the plurality of first display thumbnails is displayed, and the second display has a plurality of second display regions in which the plurality of second display thumbnails is displayed, the plurality of second display regions corresponding to the plurality of first display regions respectively, the update instruction being inputted via at least one of the plurality of first display regions and the plurality of second display regions.

3. The image-displaying device according to claim 2, wherein when one of the plurality of first display regions is initially selected and one of the plurality of second display regions is subsequently selected, the second display displays the first display thumbnail displayed in the selected first display region in the selected second display region.

4. The image-displaying device according to claim 2, wherein when one of the plurality of second display regions is initially selected and another one of the plurality of second display regions is subsequently selected, the second display displays the second display thumbnail displayed in the initially selected second display region in the subsequently selected second display region.

5. The image-displaying device according to claim 2, wherein when one of the plurality of second display regions is selected sequentially twice, the second display erases the second display thumbnail displayed in the selected second display region.

6. The image-displaying device according to claim 1, wherein each of the plurality of first thumbnails has a first sequence number corresponding to the sequence position of that first thumbnail, and each of the plurality of second thumbnails has a second sequence number corresponding to the sequence position of that second thumbnail, wherein the second display displays the second display thumbnail with the second sequence number, the second sequence number of the second thumbnail having an identical image as that of the first sequence number of the first thumbnail.

7. The image-displaying device according to claim 1, wherein the storing unit further stores third correlation data indicating a plurality of third thumbnails and a sequence of the plurality of third thumbnails, and the second display switches from displaying the plurality of second display thumbnails to displaying the plurality of third thumbnails as a plurality of third display thumbnails in response to a changing instruction.

8. The image-displaying device according to claim 7, wherein the first display includes a plurality of first display regions in which the plurality of first display thumbnails are displayed, and the second display has a plurality of second display regions in which the plurality of second display thumbnails are displayed, the plurality of second display regions corresponding to the plurality of first display regions respectively, wherein the display unit further includes an input region, the update instruction being inputted via at least one of the first display region, the second display region, and the input region, wherein when one of the plurality of first display regions is initially selected and the input region is subsequently selected when the plurality of second display thumbnails are displayed in the second display, the second display switches from displaying the plurality of second display thumbnails to displaying the plurality of the third display thumbnails in response to the changing instruction, and adds the initially selected first display thumbnail displayed in the selected first display region to the plurality of third display thumbnails.

9. The image-displaying device according to claim 1, wherein the second display sequentially displays each second thumbnail in response to a slideshow instruction.

10. The image-displaying device according to claim 1, further comprising a file creating unit configured to create a single file including images corresponding to the plurality of second thumbnails.

11. The image-displaying device according to claim 1, further comprising a printing unit configured to print images corresponding to the plurality of second thumbnails.

12. The image-displaying device according to claim 1, further comprising a facsimile transmitting unit configured to transmit images corresponding to the plurality of second thumbnails row as a facsimile.

13. The image-displaying device according to claim 1, wherein the second correlation data further includes history data indicating an update history from the initialized second correlation data.

14. The image-displaying device according to claim 13, wherein the history data indicates an initial order of the plurality of second thumbnails.

* * * * *